(12) United States Patent
Tsukui et al.

(10) Patent No.: US 9,381,965 B2
(45) Date of Patent: Jul. 5, 2016

(54) STRUCTURE OF HEADLIGHT COWL

(71) Applicant: HONDA MOTOR CO., LTD., Tokyo (JP)

(72) Inventors: Hiroaki Tsukui, Wako (JP); Kazuyuki Tachibana, Wako (JP); Hiroki Yoshino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 14/067,188

(22) Filed: Oct. 30, 2013

(65) Prior Publication Data

US 2014/0177200 A1   Jun. 26, 2014

(30) Foreign Application Priority Data

Dec. 26, 2012  (JP) ................. 2012-282525

(51) Int. Cl.
  *B62J 6/02*    (2006.01)
  *B62J 17/02*   (2006.01)
  *B62J 17/00*   (2006.01)
  *B62J 17/06*   (2006.01)
  *B62J 33/00*   (2006.01)

(52) U.S. Cl.
  CPC .. *B62J 6/02* (2013.01); *B62J 17/02* (2013.01); *B62J 17/00* (2013.01); *B62J 17/06* (2013.01); *B62J 33/00* (2013.01)

(58) Field of Classification Search
  CPC ............ B62J 17/02; B62J 17/00; B62J 17/06; B62J 33/00
  USPC .................. 296/78.1, 77.1; 362/37, 547
  See application file for complete search history.

(56) References Cited

U.S. PATENT DOCUMENTS

| | | | | |
|---|---|---|---|---|
| 5,323,869 A | * | 6/1994 | Kurayoshi | ............... B62J 15/02 180/219 |
| 6,709,042 B2 | * | 3/2004 | Takemura et al. | ............ 296/78.1 |
| 6,951,417 B2 | * | 10/2005 | Ito et al. | ......................... 362/547 |
| 2007/0240924 A1 | * | 10/2007 | Kurihara | .................. B62J 17/02 180/219 |

FOREIGN PATENT DOCUMENTS

JP           4133400 B2    8/2008
JP           2011-025891 A  2/2011

* cited by examiner

*Primary Examiner* — Joseph D Pape
*Assistant Examiner* — Dana Ivey
(74) *Attorney, Agent, or Firm* — Birch, Stewart, Kolasch & Birch, LLP (57) ABSTRACT

A structure for a headlight cowl for reducing the difference in steering feeling between the starting of a pivotal motion and a succeeding pivotal motion when the handlebar is pivoted so that the driver is less likely to have an uncomfortable feeling. The structure of a headlight cowl includes a steering apparatus supported for pivotal motion on a head pipe at a front end of a vehicle body frame and operable to turn a front wheel in accordance with a steering operation by a driver. A headlight cowl includes left and right side faces for covering the left side and the right side of a headlight provided on a front face of an upper portion of the steering apparatus and for guiding a flow of air to flow rearwardly. The headlight cowl includes projections that individually project outwardly in a vehicle widthwise direction from the left and right side faces.

20 Claims, 6 Drawing Sheets

STRUCTURE OF HEADLIGHT COWL

CROSS-REFERENCE TO RELATED APPLICATIONS

The present application claims priority under 35 USC 119 to Japanese Patent Application No. 2012-282525 filed Dec. 26, 2012 the entire contents of which are hereby incorporated by reference.

BACKGROUND OF THE INVENTION

1. Field of the Invention

The present invention relates to a structure of a headlight cowl.

2. Description of Background Art

A conventional structure for a headlight cowl is disclosed, for example, in Japanese Patent No. 4133400. The following reference numerals in parenthesis are used in Japanese Patent No. 4133400. The structure of a headlight cowl includes a steering apparatus (4) supported for pivotal motion on a head pipe at a front end of a vehicle body frame (2) and operable to turn a front wheel (3) in accordance with a steering operation by a driver to carry out the steering of the vehicle. The structure of a headlight cowl further includes a headlight cowl (1) having left and right side faces for covering the left side and the right side of a headlight (5) provided on a front face of an upper portion of the steering apparatus (4) to guide a flow of air to flow rearwardly.

With the conventional structure of a headlight cowl described above, although a flow of air can be put in order by the headlight cowl (1), such a phenomenon as may be called "sticking" of the flow of air arising from the fact that the flow of air flows appears to stick along the headlight cowl (1).

Such a "sticking" phenomenon of the flow of air to a headlight cowl as just described acts, when the handlebar is to be pivoted by the steering apparatus from a state in which the vehicle is being operated in a straightforward direction, as a resistance to the pivoting operation only upon starting of the pivotal motion.

Therefore, the conventional structure of a headlight cowl sometimes gives an uncomfortable feeling to the driver in that, when the driver tries to turn the handlebar by the steering apparatus from a state in which the vehicle is being operated in straightforward direction, the steering feeling is different between pivotal motion upon starting and succeeding pivotal motion.

SUMMARY AND OBJECTS OF THE INVENTION

The problem to be solved by an embodiment of the present invention is to provide a structure of a headlight cowl which can reduce the difference in the steering feeling between the starting of the pivotal motion and succeeding pivotal motion when the handlebar is pivoted so that the driver is less likely to have an uncomfortable feeling.

In order to solve the subject described above, according to an embodiment of the present invention, there is provided a structure of a headlight cowl which includes a steering apparatus supported for pivotal motion on a head pipe at a front end of a vehicle body frame and operable to turn a front wheel in accordance with a steering operation by a driver to carry out steering of the vehicle. A headlight cowl is provided having left and right side faces for covering the left side and the right side of a headlight provided on a front face of an upper portion of the steering apparatus and for guiding a flow of air to flow rearwardly. The headlight cowl includes projections which individually project outwardly in a vehicle widthwise direction from the left and right side faces.

With the structure of the headlight cowl as described above, the flow of air flowing along the left and right side faces of the headlight cowl is separated from the left and right side faces by the projections projecting outwardly in the vehicle widthwise direction.

Therefore, the "sticking" phenomenon of the flow of air to the headlight cowl is moderated, and also the resistance to the pivoting motion of the handlebar upon starting of the pivoting motion when the handlebar is turned by the steering apparatus from a state in which the vehicle is being operated in a straightforward direction is reduced.

Accordingly, with the present structure of a headlight cowl, the difference in the steering feeling between pivotal motion upon starting and succeeding pivotal motion when the handlebar is pivoted can be reduced to make it less likely to give an uncomfortable feeling to the driver.

According to an embodiment of the present invention, the structure of a headlight cowl may be configured such that the headlight cowl includes a front cowl and a rear cowl that are separate members from each other with the left and right side faces being provided on the front cowl while the projections are provided on the rear cowl. By such a configuration as just described, the shapes of the parts can be simplified and can be shaped readily.

According to an embodiment of the present invention, the structure of a headlight cowl may be configured such that the rear cowl serves as a stay for attaching the headlight and the front cowl to the steering apparatus. By such a configuration as just described, the number of parts and the number of assembling steps can be reduced.

According to an embodiment of the present invention, the structure of a headlight cowl may be configured such that the projections have an inclined faces extending obliquely rearwardly upwardly as viewed in side elevation. By such a configuration as just described, it is possible to guide part of the flow of air to flow upwardly thereby to reduce the lift of a front portion of the vehicle.

According to an embodiment of the present invention, the structure of a headlight cowl may be configured such that the left and right side faces include reduced width faces defining a width smaller than a width, in the vehicle widthwise direction, of the steering apparatus located rearwardly, in the proximity of the center of the headlight with regard to an upward and downward direction with increased width faces expanding upwardly from the reduced width faces but outwardly in the vehicle widthwise direction, and each of the projections being configured like a lip spoiler along a rear edge of each of the increased width faces. By such a configuration as just described, by forming the left and right side faces such that they include the reduced width faces defining a width that is smaller than the width in the vehicle widthwise direction, of the steering apparatus located rearwardly, in the proximity of the center of the headlight with regard to the upward and downward direction, also the left and right side faces of the steering apparatus can be utilized as faces for guiding flow of air to flow.

Accordingly, the left and right side faces of the headlight cowl need not be extended long rearwardly farther than the steering apparatus anymore. Thus, miniaturization of the headlight cowl can be achieved. In addition, by configuring the projections like a lip spoiler along the rear edge of the increased width face, the flow of air can be guided in the leftward and rightward directions while allowing the flow of air to escape obliquely upwardly, and consequently, the projections are less likely to provide air resistance during operation.

According to an embodiment of the present invention, the structure of a headlight cowl may be configured such that the projections overlap with a front face of a fuel tank provided on the vehicle as viewed in front elevation. By such a configuration as just described, since the flow of air from the projections is liable to be guided to the tank side faces, the air resistance to the entire vehicle during operation can be reduced.

According to an embodiment of the present invention, the structure of a headlight cowl may be configured such that the headlight cowl has an upper face that covers an upper portion of the headlight and guides the flow of air to flow rearwardly. A stepped portion that extends obliquely upwardly toward the left and the right from the center in the vehicle widthwise direction is provided on the upper face. By such a configuration as just described, also the flow of air flowing along the upper face of the headlight cowl is separated by the stepped portion and the sticking phenomenon is moderated. Further, since the flow of air is guided to escape obliquely upwardly to the left and the right from the center in the vehicle widthwise direction, the stepped portion is less likely to become an air resistance during operation.

According to an embodiment of the present invention, the structure of a headlight cowl may be configured such that a part which configures the stepped portion is a separate part. By such a configuration as just described, the individual parts can be simplified in shape and can be readily shaped.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment of a structure of a headlight cowl according to the present invention is described with reference to the drawings. It is to be noted that, in the figures, like or corresponding elements are denoted by like reference characters.

Figure 1:
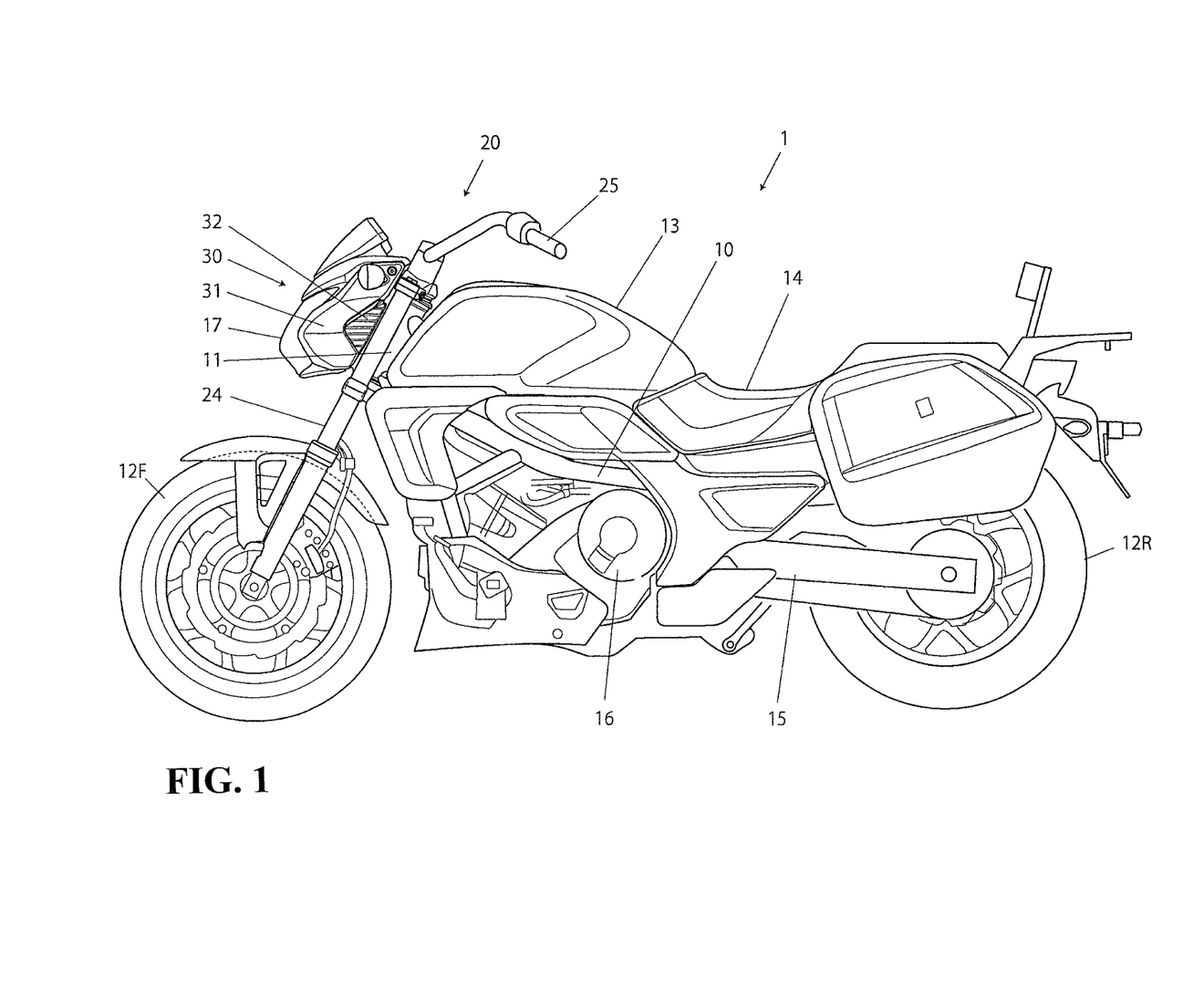
FIG. 1 is a side elevational view of a motorcycle as an example of a vehicle to which an embodiment of a structure of a headlight cowl according to the present invention is applied.

A vehicle shown in FIG. 1 is a motorcycle as an example of a vehicle to which an embodiment of the structure of a headlight cowl according to the present invention is applied.

This motorcycle 1 includes a steering apparatus 20 supported for pivotal motion on a head pipe 11 at a front end of a vehicle body frame 10 and operable to turn a front wheel 12F in accordance with a steering operation by a driver to carry out steering of the vehicle.

A fuel tank 13 is provided behind the steering apparatus 20, and a seat 14 for use by the driver is provided behind the fuel tank 13. A swing arm 15 is provided for rocking motion on the vehicle body frame 10, and a rear wheel 12R is supported for rotation at a rear end of the swing arm 15. The rear wheel 12R is driven by an engine 16.

Figure 2:
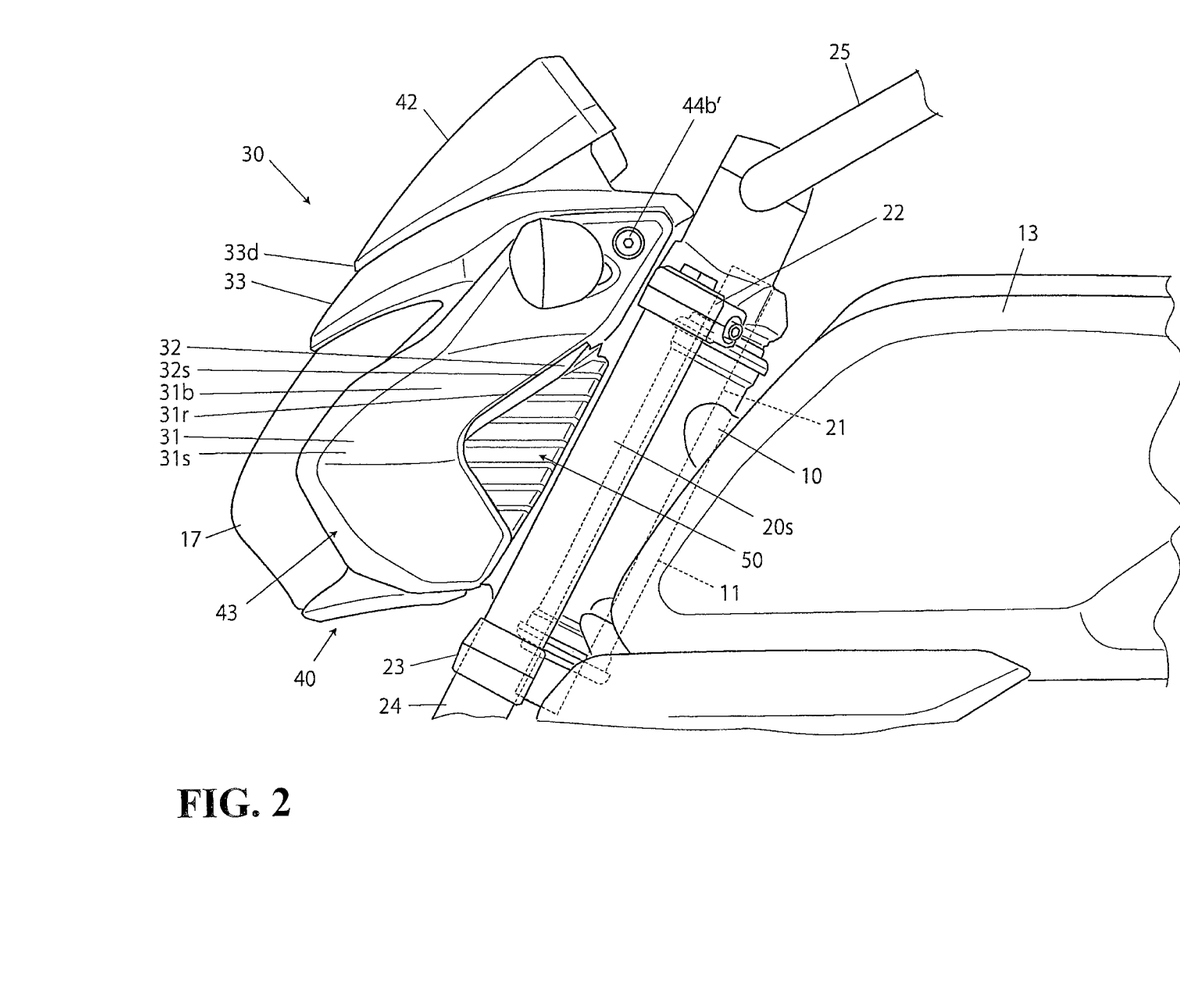
FIG. 2 is an enlarged side elevational view, partly omitted, of the motorcycle.
Figure 3:
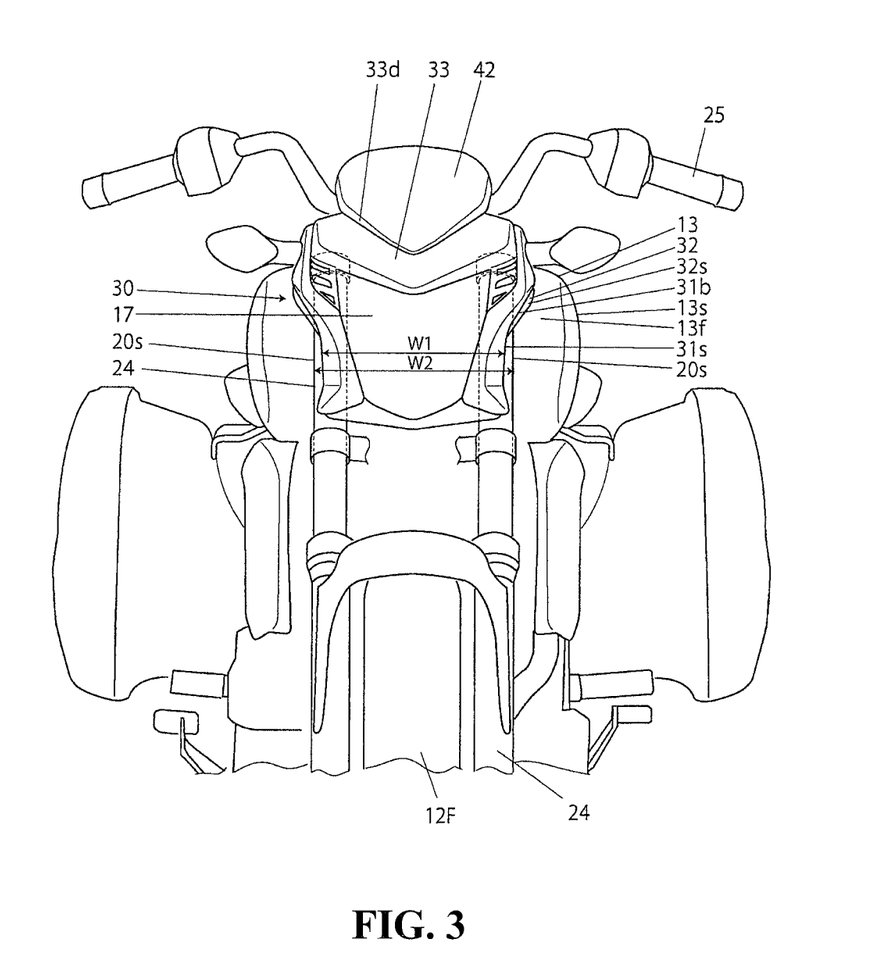
FIG. 3 is an enlarged front elevational view, partly omitted, of the motorcycle.

As shown in FIGS. 1 to 3 (principally in FIG. 2), the steering apparatus 20 includes a stem shaft 21 supported for rotation by the head pipe 11, a top bridge 22 and a bottom bridge 23 coupled to upper and lower portions of the stem shaft 21, respectively, a pair of left and right front forks 24 supported on the top bridge 22 and the bottom bridge 23, and a handlebar 25 fixed to the top bridge 22. The front wheel 12F is supported for rotation at a lower end of the front forks 24.

A headlight cowl 30 is provided on a front face of an upper portion of the steering apparatus 20.

The headlight cowl 30 is turned around the stem shaft 21 together with the front forks 24 and so forth in accordance with a pivoting operation of the steering apparatus 20.

The headlight cowl 30 includes left and right side faces 31 that cover the left and the right of a headlight 17 provided on the front face of an upper portion of the steering apparatus 20 to guide the flow of air to flow rearwardly with projections 32 projecting outwardly in a vehicle widthwise direction (leftward and right directions in FIG. 3) from the left and right side faces 31.

With such a structure of the headlight cowl as described above, the flow of air flowing along the left and right side faces 31 of the headlight cowl 30 is separated from the left and right side faces 31 by the projections 32 projecting outwardly in the vehicle widthwise direction.

Therefore, the "sticking" phenomenon of the flow of air to the headlight cowl 30 is moderated, and also the resistance to pivoting motion of the handlebar 25 upon starting of the pivoting motion when the handlebar 25 is turned by the steering apparatus 20 from a state in which the vehicle is being operated in a straightforward direction is reduced.

Accordingly, with the present structure of a headlight cowl, the difference in the steering feeling between pivotal motion upon starting and succeeding pivotal motion when the handlebar 25 is pivoted can be reduced to make it less likely to give an uncomfortable feeling to the driver.

As shown in FIG. 2, the headlight cowl 30 includes a front cowl 40 and a rear cowl 50 (refer to FIG. 6) which are different parts from each other. The left and right side faces 31 described hereinabove are provided on the front cowl 40 while the projections 32 are provided on the rear cowl 50.

By such a configuration as described above, the shapes of the parts can be simplified and can be shaped readily.

Figure 6:
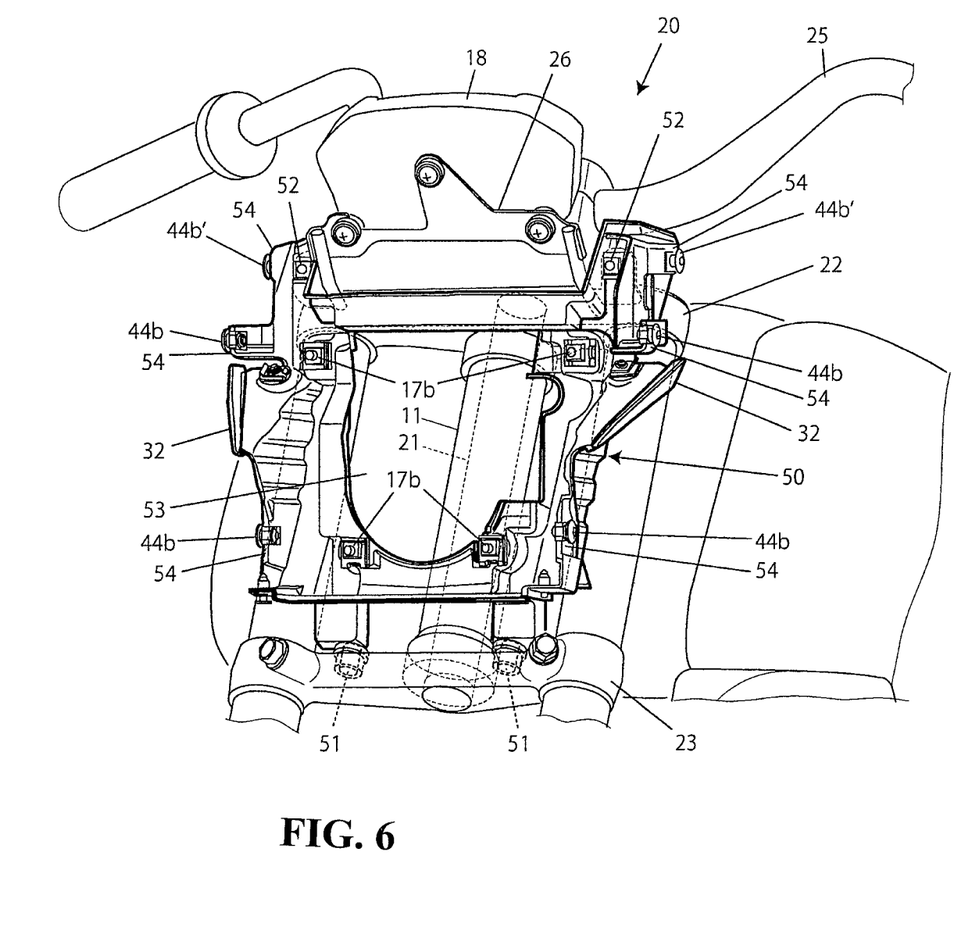
FIG. 6 is a perspective view principally showing a rear cowl 50.

As shown in FIG. 6, the rear cowl 50 serves as a stay for attaching the headlight 17 and the front cowl 40 to the steering apparatus 20.

By such a configuration as just described, the number of parts and the number of assembling steps can be reduced.

The rear cowl 50 shown in FIG. 6 is fixed at left and right portions of an upper portion thereof to the top bridge 22 through an attachment fitting 26 and is fixed to the steering apparatus 20 by inserting protrusions 51 provided at left and right portions of a lower portion thereof into the bottom bridge 23 so as to be coupled to the bottom bridge 23.

The rear cowl 50 is fixed at left and right portions of an upper portion thereof to the attachment fitting 26 by bolts and nuts 52. The attachment fitting 26 is a mounting bracket for a meter unit 18.

The rear cowl 50 has an opening 53 for receiving a rear portion of the headlight 17 therein. The headlight 17 is attached to the rear cowl 50 by fastening and fixing four flange-like attaching portions (not shown) to the rear cowl 50 by bolts and nuts 17b in such a manner that a rear end of the headlight 17 is inserted in the opening 53.

As shown in FIG. 6, the rear cowl 50 has a plurality of coupling portions 54 to the front cowl 40 at left and right portions thereof (in the arrangement shown, three coupling portions 54 on each of the left and right portions and totaling six coupling portions 54).

Figure 5:
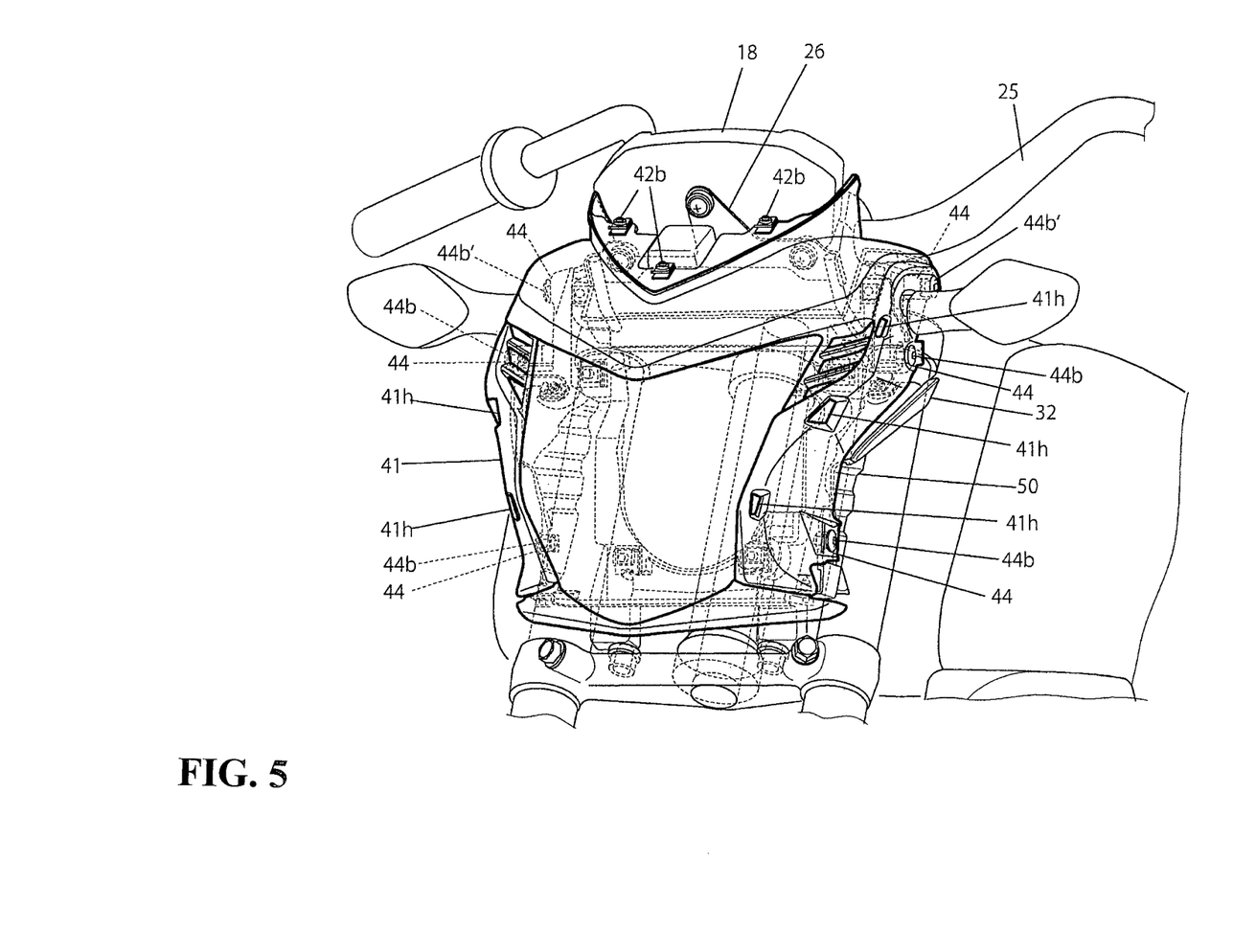
FIG. 5 is a perspective view principally showing a front cowl main body 41.

On the other hand, as shown in FIG. 5, the front cowl 40 has a number of coupling portions 44 to the rear cowl 50 equal to the number of those of the rear cowl 50 (in the arrangement shown, three coupling portions 44 on each of the left and right portions and totaling six coupling portions 44).

As shown in FIGS. 5 and 6, the front cowl 40 is fixed to the rear cowl 50 by fastening and fixing the coupling portions 44 thereof to the coupling portions 54 of the rear cowl 50 by bolts and nuts 44b and 44b'.

Figure 4:
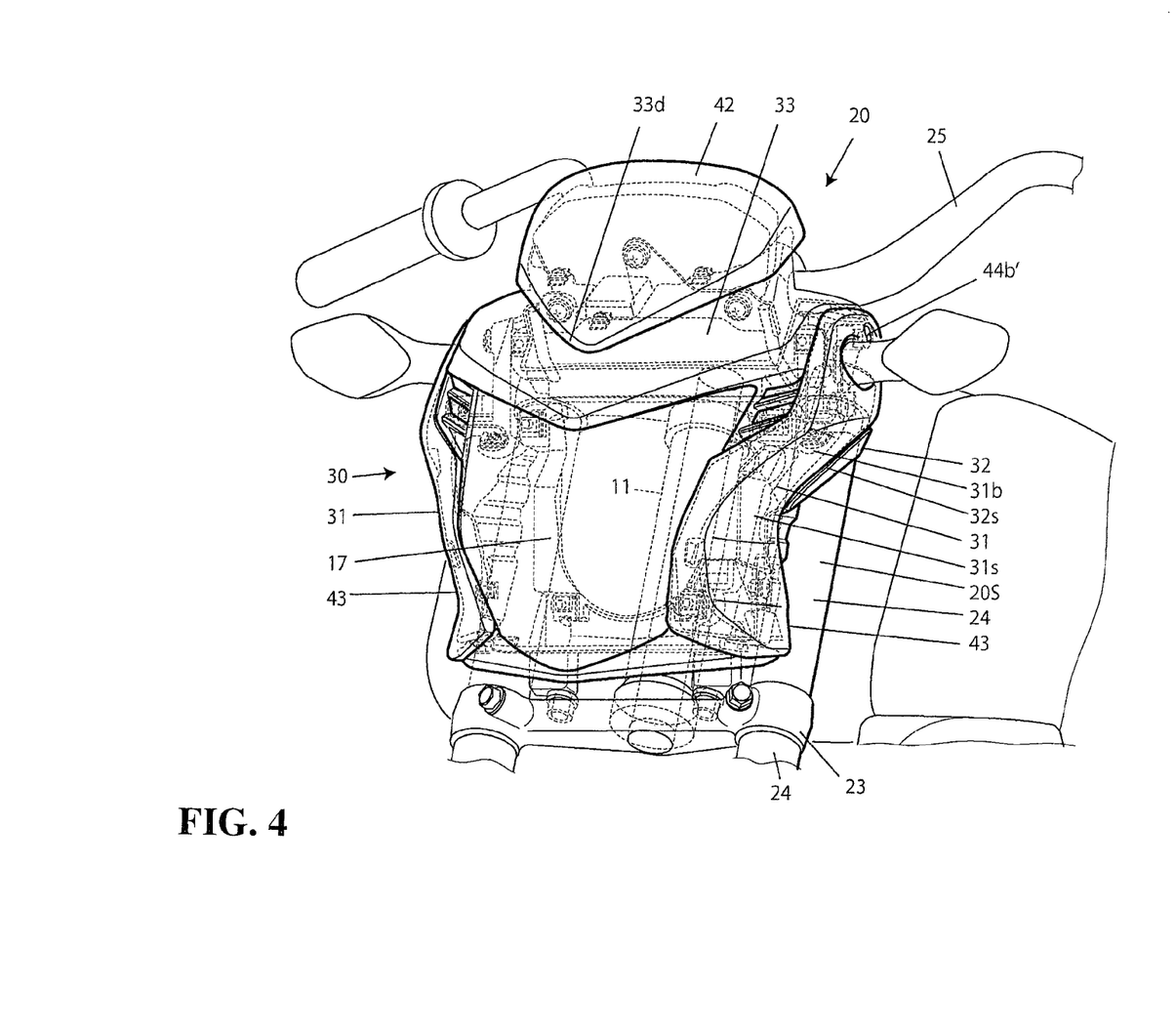
FIG. 4 is an enlarged perspective view, partly omitted, of the motorcycle.

As shown in FIGS. 2 to 4, the projections 32 have an inclined face 32s extending obliquely rearwardly upwardly as viewed in side elevation (FIG. 2).

By such a configuration as just described, it is possible to guide part of the flow of air to flow upwardly thereby to reduce the lift of a front portion of the vehicle.

As shown in FIGS. 2 to 4, the left and right side faces 31 include reduced width faces 31s defining a width W1 (FIG. 3) smaller than a width W2 (FIG. 3), in the vehicle widthwise direction, of the steering apparatus 20 located rearwardly, in the proximity of the center of the headlight 17 with regard to the upward and downward direction, and increased width faces 31b expanding upwardly from the reduced width faces 31s but outwardly in the vehicle widthwise direction. Each projection 32 is configured like a lip spoiler along a rear edge 31r (FIG. 2) of the increased width face 31b.

By such a configuration as just described, by forming the left and right side faces 31 such that they include the reduced width faces 31s defining the width W1 smaller than the width W2, in the vehicle widthwise direction, of the steering apparatus 20 located rearwardly, in the proximity of the center of the headlight 17 with regard to the upward and downward direction, also the left and right side faces 20s of the steering apparatus 20 can be utilized as faces for guiding the flow of air to flow. Accordingly, the left and right side faces 31 of the headlight cowl 30 need not be extended long rearwardly farther than the steering apparatus 20 anymore. Thus, as a result, miniaturization of the headlight cowl 30 can be achieved. In addition, by configuring the projections 32 like a lip spoiler along the rear edge 31r of the increased width face 31b, the flow of air can be guided in the leftward and rightward directions while allowing the flow of air to escape obliquely upwardly, and consequently, the projections 32 are less likely to provide air resistance during operation of the vehicle.

As shown in FIG. 3, the projections 32 overlap with a front face 13f of the fuel tank 13 provided on the vehicle as viewed in front elevation.

By such a configuration as just described, since the flow of air from the projections 32 is liable to be guided to the tank side faces 13s, the air resistance during operation of the vehicle is reduced for the entire vehicle.

As shown in FIGS. 2 to 4, the headlight cowl 30 has an upper face 33 that covers an upper portion of the headlight 17 to guide flow of air to flow rearwardly. On this upper face 33, a stepped portion 33d is provided that extends obliquely upwardly toward the left and the right from the center in the vehicle widthwise direction.

By such a configuration as just described, also the flow of air flowing along the upper face 33 of the headlight cowl 30 is separated by the stepped portion 33d and the sticking phenomenon is moderated. Further, since the flow of air is guided to escape obliquely upwardly to the left and the right from the center in the vehicle widthwise direction, the stepped portion 33d is less likely to provide an air resistance during operation of the vehicle.

The part which configures the stepped portion 33d is a separate part 42.

By such a configuration as just described, the individual parts can be simplified in shape and can be shaped readily.

Referring to FIGS. 4 and 5, the part 42 is a cover that covers a region from a middle portion of the upper face 33 of the headlight cowl 30 to the meter unit 18 and is fixed to a main body (hereinafter referred to as front cowl main body) 41 of the front cowl by bolts and nuts 42b (refer to FIG. 5).

The part which configures each side face 31 is a separate part 43.

Referring to FIGS. 4 and 5, the part 43 is a side cover that covers a side portion of the front cowl main body 41.

Engaging pawls (not shown) extending toward the front cowl main body 41 side are provided on the side cover 43, and a plurality of engaging holes 41h (FIG. 5) for engaging with the engaging pawls are provided on the front cowl main body 41.

The side cover 43 is attached to the front cowl main body 41 and the rear cowl 50 by engaging the engaging pawls thereof with the engaging holes 41h of the front cowl main body 41 and fastening and fixing an upper portion thereof to the rear cowl 50 together with the front cowl main body 41 by the bolts and nuts 44b' positioned at the upper most position from among the bolts and nuts 44b and 44b' described hereinabove.

While the embodiment of the present invention has been described above, the present invention is not limited to the embodiment described above but can be carried out in suitably modified forms without departing from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure of a headlight cowl comprising:
   a steering apparatus supported for pivotal motion on a head pipe at a front end of a vehicle body frame of a vehicle and operable to turn a front wheel; and
   a headlight cowl having left and right side faces for covering the left side and the right side of a headlight provided on a front face of an upper portion of the steering apparatus and for guiding a flow of air to flow rearwardly;
   wherein the headlight cowl includes projections that individually project outwardly from the left and right side faces of the headlight cowl in a vehicle front view in a widthwise direction from the left and right side faces of the headlight cowl;

wherein at least a part of the steering apparatus is exposed outside of the left and right side faces of the headlight cowl in the vehicle front view.

2. The structure of a headlight cowl according to claim 1, wherein the headlight cowl includes a front cowl and a rear cowl that are separate members from each other, and the left and right side faces are provided on the front cowl while the projections are provided on the rear cowl.

3. The structure of a headlight cowl according to claim 2, wherein the rear cowl serves as a stay for attaching the headlight and the front cowl to the steering apparatus.

4. The structure of a headlight cowl according to claim 3, wherein the projections have an inclined face extending obliquely rearwardly upwardly as viewed in a side elevation.

5. The structure of a headlight cowl according to claim 3, wherein the left and right side faces include:
reduced width faces defining a width smaller than a width, in the vehicle widthwise direction, of the steering apparatus located rearwardly, in the proximity of the center of the headlight with regard to an upward and downward direction, and
increased width faces expanding upwardly from the reduced width faces but outwardly in the vehicle widthwise direction, and
each of the projections is configured like a lip spoiler along a rear edge of each of the increased width faces.

6. The structure of a headlight cowl according to claim 3, wherein the projections overlap with a front face of a fuel tank provided on the vehicle as viewed in front elevation.

7. The structure of a headlight cowl according to claim 2, wherein the projections have an inclined face extending obliquely rearwardly upwardly as viewed in a side elevation.

8. The structure of a headlight cowl according to claim 2, wherein the left and right side faces include:
reduced width faces defining a width smaller than a width, in the vehicle widthwise direction, of the steering apparatus located rearwardly, in the proximity of the center of the headlight with regard to an upward and downward direction, and
increased width faces expanding upwardly from the reduced width faces but outwardly in the vehicle widthwise direction, and
each of the projections is configured like a lip spoiler along a rear edge of each of the increased width faces.

9. The structure of a headlight cowl according to claim 2, wherein the projections overlap with a front face of a fuel tank provided on the vehicle as viewed in front elevation.

10. The structure of a headlight cowl according to claim 2, wherein the headlight cowl has an upper face that covers an upper portion of the headlight and guides the flow of air to flow rearwardly, and a stepped portion is provided on the upper face that extends obliquely upwardly toward the left and the right from the center in the vehicle widthwise direction.

11. The structure of a headlight cowl according to claim 1, wherein the projections have an inclined face extending obliquely rearwardly upwardly as viewed in a side elevation.

12. The structure of a headlight cowl according to claim 11, wherein the left and right side faces include:
reduced width faces defining a width smaller than a width, in the vehicle widthwise direction, of the steering apparatus located rearwardly, in the proximity of the center of the headlight with regard to an upward and downward direction, and
increased width faces expanding upwardly from the reduced width faces but outwardly in the vehicle widthwise direction, and
each of the projections is configured like a lip spoiler along a rear edge of each of the increased width faces.

13. The structure of a headlight cowl according to claim 1, wherein the projections overlap with a front face of a fuel tank provided on the vehicle as viewed in front elevation.

14. The structure of a headlight cowl according to claim 1, wherein the headlight cowl has an upper face that covers an upper portion of the headlight and guides the flow of air to flow rearwardly, and a stepped portion is provided on the upper face that extends obliquely upwardly toward the left and the right from the center in the vehicle widthwise direction.

15. The structure of a headlight cowl according to claim 14, wherein a part that configures the stepped portion is a separate part.

16. A structure of a headlight cowl comprising:
a vehicle body frame;
a head pipe positioned at a front portion of the vehicle body frame;
a steering apparatus supported for pivotal motion on the head pipe; and
a headlight cowl having left and right side faces for covering the left side and the right side of a headlight provided on a front face of an upper portion of the steering apparatus and for guiding a flow of air to flow rearwardly;
projections provided on the headlight cowl that individually project outwardly from the left and right side faces of the headlight cowl in a vehicle front view in a widthwise direction from the left and right side faces of the headlight cowl;
wherein at least a part of the steering apparatus is exposed outside of the left and right side faces of the headlight cowl in the vehicle front view.

17. The structure of a headlight cowl according to claim 16, wherein the headlight cowl includes a front cowl and a rear cowl that are separate members from each other, and the left and right side faces are provided on the front cowl while the projections are provided on the rear cowl.

18. The structure of a headlight cowl according to claim 17, wherein the rear cowl serves as a stay for attaching the headlight and the front cowl to the steering apparatus.

19. The structure of a headlight cowl according to claim 16, wherein the projections have an inclined face extending obliquely rearwardly upwardly as viewed in a side elevation.

20. A structure of a headlight cowl comprising:
a steering apparatus supported for pivotal motion on a head pipe at a front end of a vehicle body frame of a vehicle and operable to turn a front wheel; and
a headlight cowl having left and right side faces for covering the left side and the right side of a headlight provided on a front face of an upper portion of the steering apparatus and for guiding a flow of air to flow rearwardly;
wherein the headlight cowl includes projections that individually project outwardly in a vehicle widthwise direction from the left and right side faces;
said left and right side faces include:
reduced width faces defining a width smaller than a width, in the vehicle widthwise direction, of the steering apparatus located rearwardly, in the proximity of the center of the headlight with regard to an upward and downward direction, and
increased width faces expanding upwardly from the reduced width faces but outwardly in the vehicle widthwise direction, and each of the projections is configured like a lip spoiler along a rear edge of each of the increased width faces.

* * * * *